United States Patent
Hosie et al.

(10) Patent No.: US 9,843,550 B2
(45) Date of Patent: Dec. 12, 2017

(54) PROCESSING MESSAGES IN A DATA MESSAGING SYSTEM USING CONSTRUCTED RESOURCE MODELS

(71) Applicant: INTERNATIONAL BUSINESS MACHINES CORPORATION, Armonk, NY (US)

(72) Inventors: John Hosie, Hursley (GB); Martin A. Ross, Hursley (GB); Craig H. Stirling, Hursley (GB); Dominic J. Storey, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/953,354

(22) Filed: Nov. 29, 2015

(65) Prior Publication Data

US 2017/0155610 A1 Jun. 1, 2017

(51) Int. Cl.
*G06F 15/16* (2006.01)
*H04L 12/58* (2006.01)
*H04L 12/853* (2013.01)
*H04L 12/875* (2013.01)
*H04L 12/851* (2013.01)
*H04L 12/863* (2013.01)
*G06F 9/54* (2006.01)

(52) U.S. Cl.
CPC .............. *H04L 51/26* (2013.01); *G06F 9/546* (2013.01); *H04L 47/2416* (2013.01); *H04L 47/2441* (2013.01); *H04L 47/50* (2013.01); *H04L 47/56* (2013.01)

(58) Field of Classification Search
CPC . H04L 47/50; H04L 47/2416; H04L 47/6215; H04L 47/56; H04L 47/2441; H04L 12/40143; H04L 51/26; G06F 9/546; G06F 3/1263
USPC .................................. 709/206, 207
See application file for complete search history.

(56) References Cited

U.S. PATENT DOCUMENTS 5,627,764 A * 5/1997 Schutzman ............ G06N 5/022
 358/402
5,878,351 A * 3/1999 Alanara .................. H04W 4/14
 340/7.21

(Continued)

OTHER PUBLICATIONS

Anonymous;"Dynamic policy for queue artefacts in messaging systems with respect to resource prioritisation;" ip.com Disclosure No. IPCOM000239028D; Oct. 2, 2014; 2 pages.

(Continued)

*Primary Examiner* — Daniel C. Murray
(74) *Attorney, Agent, or Firm* — Cantor Colburn LLP (57) ABSTRACT

A data messaging system includes a plurality of processing nodes. Each message processed by the data messaging system has associated with it a priority level. A first message is received for processing at a processing node of the plurality of processing nodes. It is determined if the processing node has an associated message staging area, and if a second message received by the data messaging system has a higher priority value than the first message. Based on a determination that the second message has a higher priority value than the first message, the processing of the first message by the processing node is delayed, and the second message is processed using the processing node instead.

11 Claims, 7 Drawing Sheets

(56) References Cited

U.S. PATENT DOCUMENTS

| | | | | |
|---|---|---|---|---|
| 5,913,921 | A * | 6/1999 | Tosey | G06F 21/606 709/220 |
| 6,032,258 | A * | 2/2000 | Godoroja | G06F 21/606 380/278 |
| 6,073,142 | A * | 6/2000 | Geiger | G06Q 10/107 709/204 |
| 6,088,336 | A * | 7/2000 | Tosey | G06F 21/606 370/255 |
| 6,173,157 | B1 * | 1/2001 | Godoroja | G06F 21/606 340/7.41 |
| 6,658,485 | B1 * | 12/2003 | Baber | G06F 9/546 718/103 |
| 6,771,653 | B1 * | 8/2004 | Le Pennec | H04L 12/5693 370/412 |
| 6,826,153 | B1 * | 11/2004 | Kroon | H04L 47/10 370/235 |
| 6,938,024 | B1 * | 8/2005 | Horvitz | G06N 99/005 370/229 |
| 6,952,398 | B1 * | 10/2005 | Fahim | H04L 41/0896 370/229 |
| 7,191,159 | B2 * | 3/2007 | Horvitz | G06N 99/005 706/1 |
| 7,339,942 | B2 * | 3/2008 | Morgan | H04L 12/4625 370/412 |
| 7,415,504 | B2 * | 8/2008 | Schiavone | H04L 12/585 370/392 |
| 7,421,703 | B2 * | 9/2008 | Yamamoto | H04M 3/5235 718/100 |
| 7,433,859 | B2 * | 10/2008 | Horvitz | G06N 99/005 706/45 |
| 7,543,036 | B2 * | 6/2009 | Schiavone | H04L 12/585 370/260 |
| 7,571,214 | B2 * | 8/2009 | Schiavone | H04L 12/585 370/230 |
| 7,634,545 | B2 * | 12/2009 | Schiavone | H04L 12/585 370/231 |
| 7,706,398 | B2 * | 4/2010 | Jung | H04L 12/40143 180/54.1 |
| 7,746,773 | B2 * | 6/2010 | Gerdes | G06F 9/546 370/230 |
| 7,852,865 | B2 * | 12/2010 | Gay | H04L 12/2801 370/412 |
| 7,865,903 | B2 * | 1/2011 | Yamamoto | H04M 3/5235 718/100 |
| 7,941,491 | B2 * | 5/2011 | Sood | H04L 51/12 709/206 |
| 7,944,935 | B2 * | 5/2011 | Bucknell | H04L 12/5693 340/429 |
| 8,065,375 | B2 * | 11/2011 | Reistad | G06Q 30/02 709/206 |
| 8,081,659 | B2 * | 12/2011 | Sowinski | H04J 3/1694 370/389 |
| 8,244,817 | B2 * | 8/2012 | Kay | H04L 51/12 707/999.009 |
| 8,260,870 | B2 * | 9/2012 | Reistad | G06Q 30/02 709/206 |
| 8,380,575 | B2 * | 2/2013 | Foygel | G06Q 30/0601 705/26.1 |
| 8,433,768 | B1 * | 4/2013 | Bush | H04L 63/1433 703/23 |
| 8,452,866 | B2 * | 5/2013 | De Boer | H04L 47/14 709/224 |
| 8,539,097 | B2 * | 9/2013 | Maes | H04L 51/12 455/406 |
| 8,751,712 | B2 * | 6/2014 | Preston | B60R 25/00 710/100 |
| 8,799,388 | B2 * | 8/2014 | Kay | H04L 51/12 709/206 |
| 8,805,320 | B2 * | 8/2014 | Alman | H04L 67/2828 455/404.1 |
| 8,824,484 | B2 * | 9/2014 | Vallala | H04L 49/3054 370/389 |
| 8,923,147 | B2 * | 12/2014 | Krishnaswamy | G08G 1/093 370/252 |
| 9,319,254 | B2 * | 4/2016 | Haq | H04L 27/0008 |
| 2001/0012270 | A1 * | 8/2001 | Godoroja | G06F 21/606 370/230 |
| 2002/0049608 | A1 * | 4/2002 | Hartsell | G06Q 10/10 709/226 |
| 2002/0120705 | A1 * | 8/2002 | Schiavone | H04L 12/585 709/207 |
| 2002/0152305 | A1 * | 10/2002 | Jackson | H04L 12/26 709/224 |
| 2003/0076849 | A1 * | 4/2003 | Morgan | H04L 12/4625 370/412 |
| 2004/0100906 | A1 * | 5/2004 | Gay | H04L 12/2801 370/235 |
| 2004/0236719 | A1 * | 11/2004 | Horvitz | G06N 99/005 |
| 2006/0010217 | A1 * | 1/2006 | Sood | H04L 51/12 709/206 |
| 2006/0167824 | A1 * | 7/2006 | Horvitz | G06N 99/005 706/1 |
| 2006/0171410 | A1 * | 8/2006 | Jung | H04L 12/40143 370/447 |
| 2006/0212917 | A1 * | 9/2006 | Boucher | H04L 12/2801 725/105 |
| 2007/0121896 | A1 * | 5/2007 | Patakula | H04M 3/5233 379/265.05 |
| 2007/0189159 | A1 * | 8/2007 | Gerdes | G06F 9/546 370/230 |
| 2007/0297435 | A1 * | 12/2007 | Bucknell | H04L 12/5693 370/412 |
| 2008/0016172 | A1 * | 1/2008 | Schiavone | H04L 12/585 709/206 |
| 2008/0016173 | A1 * | 1/2008 | Schiavone | H04L 12/585 709/207 |
| 2008/0016174 | A1 * | 1/2008 | Schiavone | H04L 12/585 709/207 |
| 2009/0125595 | A1 * | 5/2009 | Maes | H04L 51/12 709/206 |
| 2010/0002719 | A1 * | 1/2010 | Sowinski | H04J 3/1694 370/458 |
| 2010/0017492 | A1 * | 1/2010 | Reistad | G06Q 30/02 709/206 |
| 2010/0158045 | A1 * | 6/2010 | Shin | H04L 12/40071 370/473 |
| 2010/0217811 | A1 * | 8/2010 | Kay | H04L 51/12 709/206 |
| 2010/0241312 | A1 * | 9/2010 | Preston | B60R 25/00 701/36 |
| 2010/0299433 | A1 * | 11/2010 | De Boer | H04L 47/14 709/224 |
| 2010/0302941 | A1 * | 12/2010 | Prabhakar | H04L 47/10 370/230 |
| 2011/0145125 | A1 * | 6/2011 | Foygel | G06Q 30/0601 705/37 |
| 2011/0178962 | A1 * | 7/2011 | Sood | H04L 51/12 706/11 |
| 2011/0282956 | A1 * | 11/2011 | Reistad | G06Q 30/02 709/206 |
| 2012/0297001 | A1 * | 11/2012 | Reistad | G06Q 30/02 709/206 |
| 2013/0083679 | A1 * | 4/2013 | Krishnaswamy | G08G 1/093 370/252 |
| 2013/0138549 | A1 * | 5/2013 | Foygel | G06Q 40/04 705/37 |
| 2013/0188642 | A1 * | 7/2013 | Vallala | H04L 49/3054 370/392 |
| 2014/0037027 | A1 * | 2/2014 | Haq | H04L 27/0008 375/340 |
| 2014/0082215 | A1 * | 3/2014 | Tune | H04L 45/00 709/240 |
| 2014/0148116 | A1 * | 5/2014 | Alman | H04L 67/2828 455/404.1 |
| 2014/0369350 | A1 * | 12/2014 | Vallala | H04L 49/3054 370/389 |
| 2015/0063112 | A1 * | 3/2015 | Wu | H04L 45/302 370/235 |

(56) References Cited

U.S. PATENT DOCUMENTS

OTHER PUBLICATIONS

Priotiritizing the Processing of Messages—Advanced Adapter Engine [online]; [retrieved on Jun. 30, 2015]; retrieved from the Internet http://help.sap.com/saphelp_nw73/helpdata/en/48/b2e00f6b156ff4e100 . . . 2 pages.

\* cited by examiner

1
Data Messaging System

PROCESSING MESSAGES IN A DATA MESSAGING SYSTEM USING CONSTRUCTED RESOURCE MODELS

BACKGROUND

The present invention relates to processing messages in a data messaging system.

SUMMARY

In accordance with a one embodiment there is provided a computer-implemented method of processing messages in a data messaging system comprising a plurality of processing nodes, wherein each message processed by the data messaging system has associated with it a priority level. The method includes receiving a first message for processing at a processing node of the plurality of processing nodes and determining if the processing node has an associated message staging area. Based on a determination that the processing node has an associated message staging area, the method includes determining if a second message received by the data messaging system has a higher priority value than the first message. Based on a determination that the second message has a higher priority value than the first message, the method includes delaying processing of the first message by the processing node, and processing the second message using the processing node.

In accordance with another embodiment there is provided a data messaging system for processing messages having a plurality of processing nodes. Each message that is processed by the data messaging system has associated with it a priority level. The data messaging system is configured to receive a first message for processing at a processing node of the plurality of processing nodes and determine if the processing node has an associated message staging area. Based on a determination that the processing node has an associated message staging area, the data messaging system is configured to determine if a second message received by the data messaging system has a higher priority value than the first message. Based on a determination that the second message has a higher priority value than the first message, the data messaging system is configured to delay processing of the first message by the processing node, and process the second message using the processing node.

In accordance with another embodiment, there is provided a computer program product for processing messages in a data messaging system having a plurality of processing nodes, wherein each message processed by the data messaging system has associated with it a priority level. The computer program product includes a computer-readable storage medium having computer-readable program code embodied therewith, the computer-readable program code configured to perform a method. The method includes receiving a first message for processing at a processing node of the plurality of processing nodes and determining if the processing node has an associated message staging area. Based on a determination that the processing node has an associated message staging area, the method includes determining if a second message received by the data messaging system has a higher priority value than the first message. Based on a determination that the second message has a higher priority value than the first message, the method includes delaying processing of the first message by the processing node, and processing the second message using the processing node.

It will of course be appreciated that features described in relation to one aspect of the present invention may be incorporated into other aspects of the present invention. For example, the method of the invention may incorporate any of the features described with reference to the computer system of the invention and vice versa.

BRIEF DESCRIPTION OF THE DRAWINGS

Preferred embodiments of the present invention will now be described, by way of example only, with reference to the following drawings in which.

DETAILED DESCRIPTION

Data messaging systems provide connectivity and integration between various systems and services. Examples of data messaging systems include IBM Integration Bus (IIB), IBM Websphere MQ, and Java Message Service. Users of such data messaging systems can develop applications to integrate their systems and services, which are sometimes referred to as message flows.

Message flows may comprise a number of distinct nodes connected together, with the different nodes performing different individual functions as part of the composite application. For example, there could be an XSLT node, a routing node, an MQ output node, etc. Different nodes will exhibit different behaviours. For example, some may be CPU intensive, some disk input/output (I/O) intensive etc. Such data messaging system often process messages for which a priority value can be specified.

Figure 1:
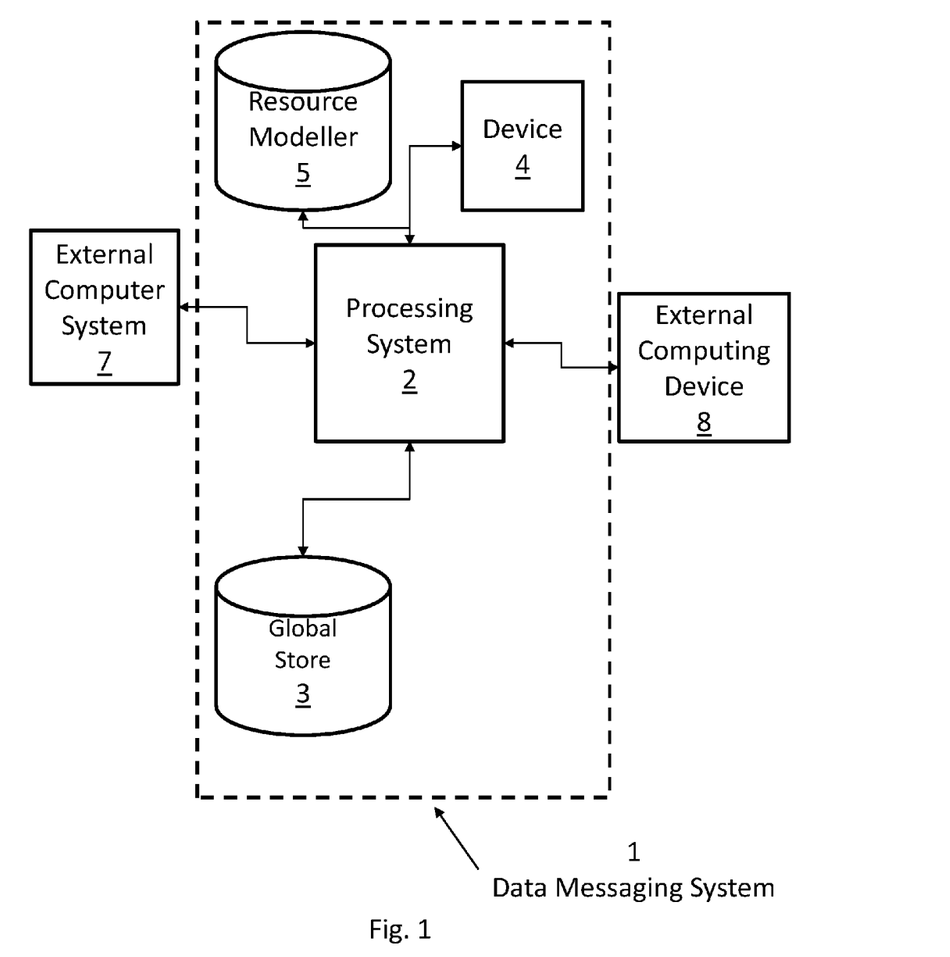
FIG. 1 is a schematic diagram showing a data messaging system in accordance with an embodiment of the invention.

FIG. 1 shows a data messaging system in accordance with an embodiment of the invention. The data messaging system 1 comprises a processing system 2, which is in communication with external computer systems 7 and 8, to provide connectivity and integration between the external computer systems 7 and 8. It will be appreciated that in practice, the processing system 2 may comprise a single computing device or multiple computing devices in connection with each other. It will further be appreciated that a data messaging system 1 will commonly be used to connectivity and integration between multiple external computing devices, rather than just two.

The data messaging system 1 further comprises a global store 3, a statistical data capture device 4, and a resource modeller 5, all of which are in communication with the processing system 2. The statistical data capture device 4 and a resource modeller 5 are as in direct communication.

The operation of the data messaging system 1 when processing a message, when the data messaging system 1 is in an initial state, is now described with reference to the flowchart of FIG. 2a, and the chart of FIG. 4a which represent the processing nodes of the data messaging system in the initial state.

Figure 2A:
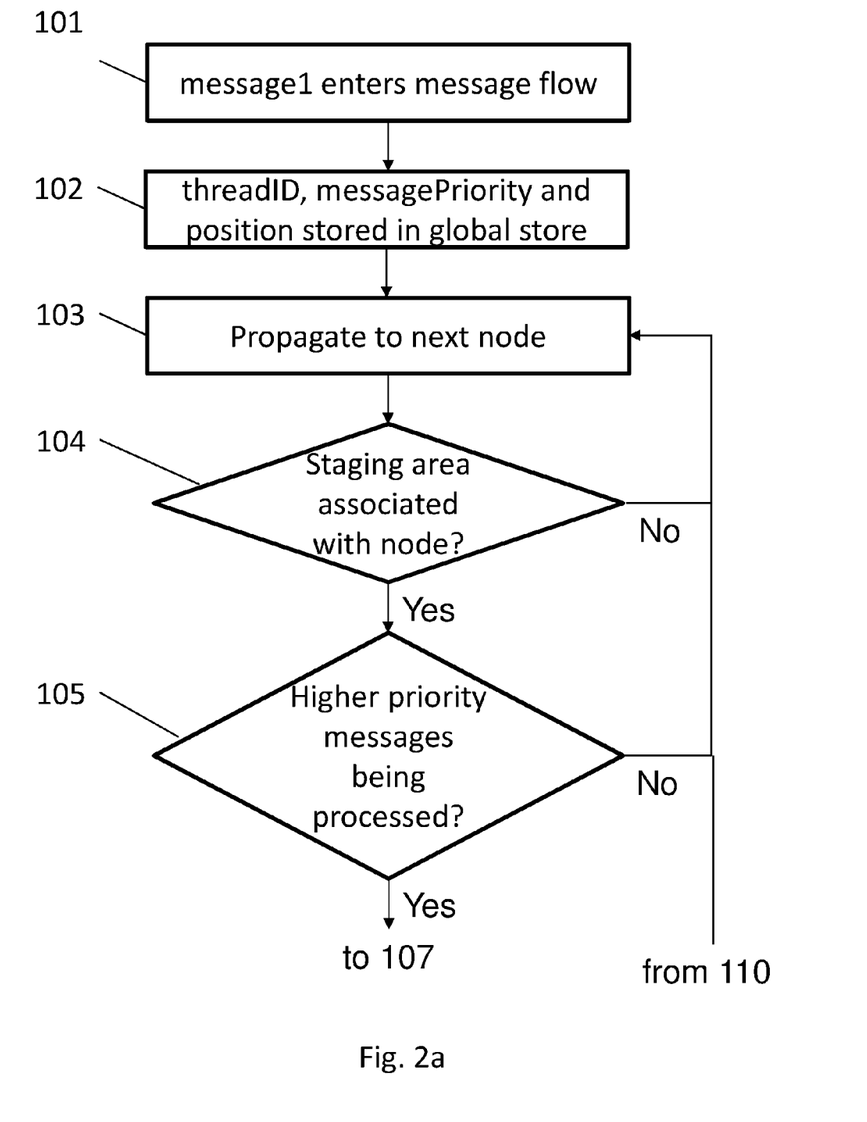
FIGS. 2a to 2c are a flowchart showing the operation of the data messaging system of FIG. 1.

As shown in FIG. 2a, in a first step a message, herein called message1, enters the message flow (step 101). The message may for example be passed by the external computing device 7 to the data messaging system 1, in particular the processing system 2 thereof, to be processed and passed to the external computing device 8. The ID of the thread message1 is being processed by (threadID), the priority level of message1 (messagePriority) and its position in the message flow are stored in the global store 3 (step 102).

Figure 4A:
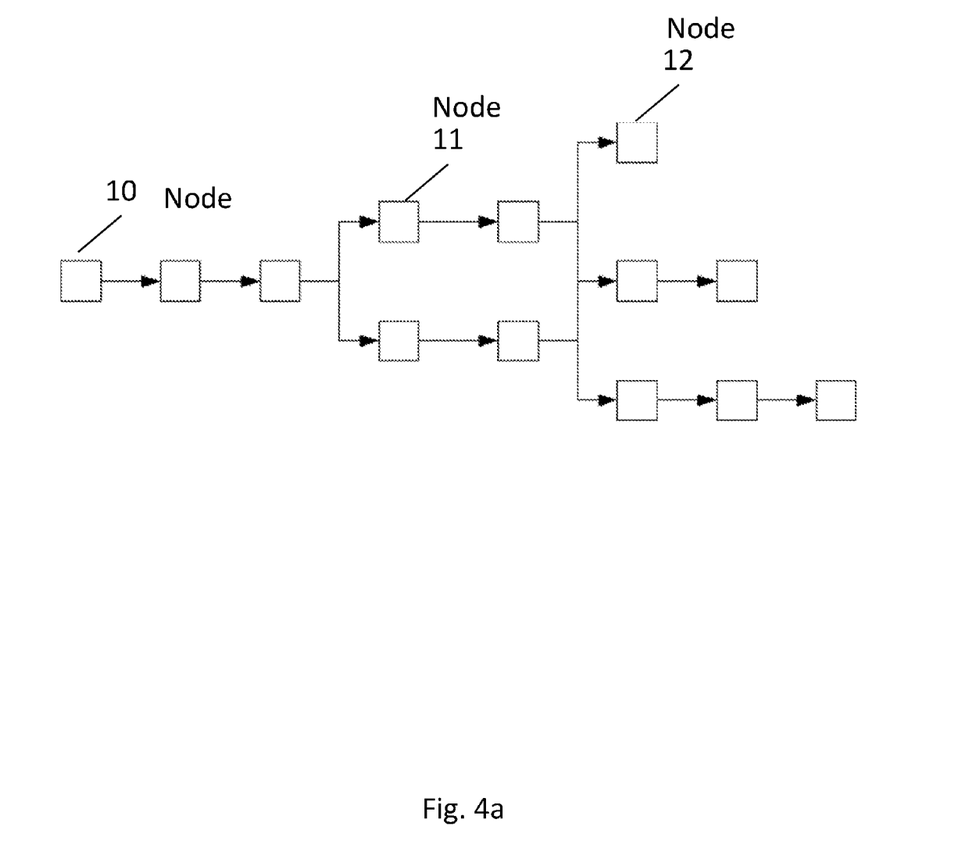
FIGS. 4a and 4b are representations of the processing nodes of the data messaging system of FIG. 1.

The message is propagated to the next node (step 103), which as the message 1 has just entered the message flow is the initial node 10 of FIG. 4a. The data messaging system 1 then checks if any staging area has been associated with the node 10 (step 104). In the present example, as the data messaging system 1 is in an initial state, there are no staging areas associated with any nodes of the data messaging system 1. As a result, steps 103 and 104 are repeated in turn, and message1 simply propagates to successive nodes. As message1 propagates through data messaging system 1, its position recorded in the global store 3 is updated, as is its priority if that is modified at any time.

The message message1 may, for example, propagate from node 10, along the middle upper branch of FIG. 4a that includes node 11, along the rightmost upper branch of FIG. 4a that includes node 12, after which it has finished processing and is passed to its destination, the external computing device 8.

As can be seen, the data messaging system 1 in the initial state operates in much the same way as a conventional data messaging system, other than the data being stored in the global store 3. While the message is being processed by the data messaging system 1, statistical data about the processing of the message by the processing nodes can be collected by the statistical data capture device 4. Such data could be captured using the known Accounting and Statistics capture functionality of IIB, for example. It will be appreciated that in alternative embodiments of the invention the statistical data could be captured in various other ways.

Figure 3:
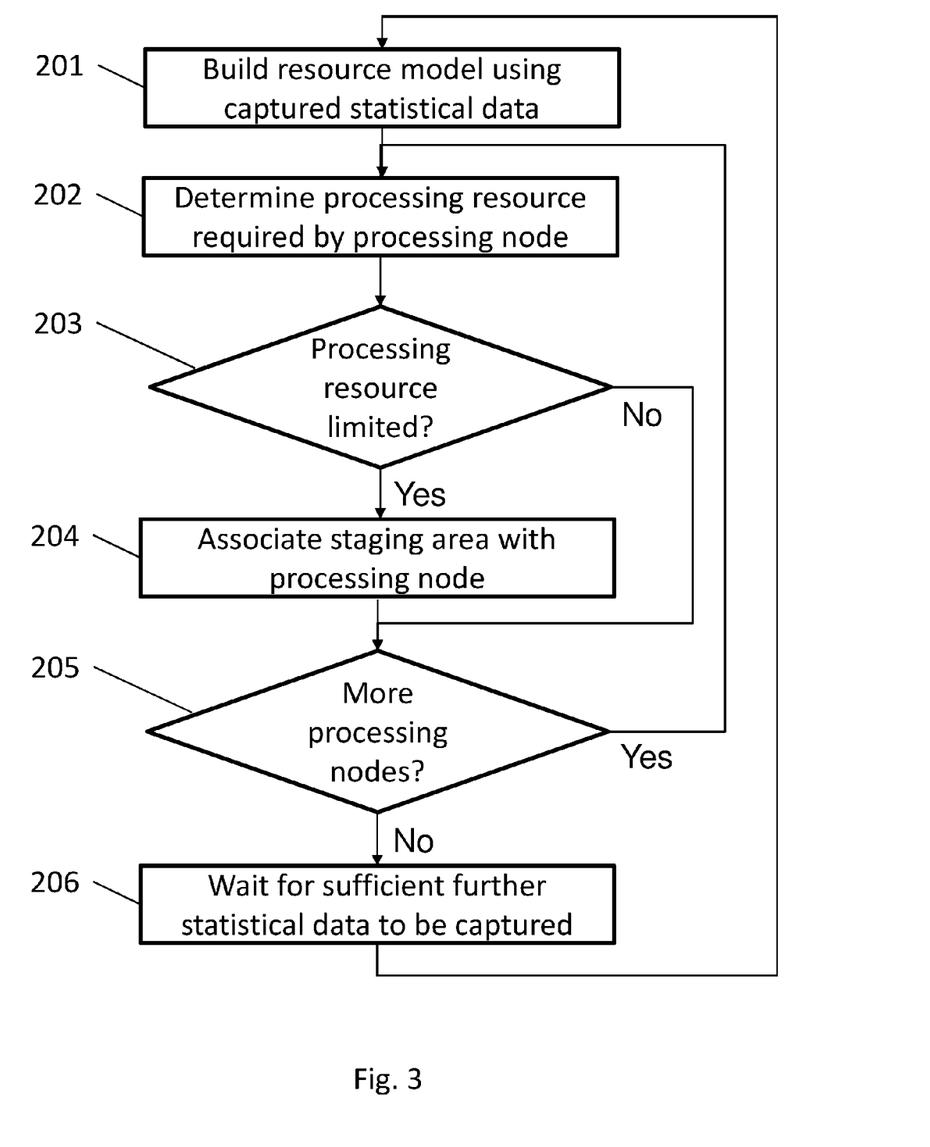
FIG. 3 is a flowchart showing the further operation of the data messaging system of FIG. 1.

The use of the captured statistical data is used by the data messaging system 1 is now described, with reference to the flowchart of FIG. 3. First, the resource modeller 5 uses the statistical data to build resource models for the processing nodes of, and messages processed by, the data messaging system 1 (step 201). It will be appreciated that the resource models can be built using any of various standard statistical techniques.

The resource models allow the data messaging system 1 to determine the resources that will be used by messages processed by the data messaging system 1 (or an estimation thereof), based on the properties of the message. For example a resource model may allow resources such as the CPU usage, memory usage and/or disk I/O a message will require while being processed, to be determined from the properties of the message such as its size, type, format, structure, schema and/or purpose. Statistical data such as the time taken to process a message may also be used. Different processing nodes can have their own separate resource models, and may or may not depending on whether they share processing resources or not, amongst other things. (Two processing nodes may share a CPU but use separate memory areas, for example, and in that case may share a CPU resource model but have separate memory resource models.)

For each processing node of the data messaging system 1, the resource models also allow the data messaging system 1 to identify the processing resources required by the processing node during the processing of messages (step 202). The data messaging system 1 can then determine if the processing node will (or is likely to) experience limiting processing resources during operation of the data messaging system 1 (step 203), for example insufficient CPU availability to process multiple messages at the same time at optimal speed.

The statistical data capture device 4 can also capture the actual historical use of processing resources by the processing node, time taken for messages to be processed, and so on, during operation of the data messaging system 1, and so directly identify if the processing node will (or is likely to) experience limiting processing resources (on the basis of whether it has in the past).

If the data messaging system 1 determines that the processing node will experience limiting processing resources, it associates a staging area with the processing node (step 204). The use of the staging area is described later below. If not, it skips straight to the next step.

It will be appreciated that associating a staging area with a processing node may merely involve adding a flag to the processing node so that it is identified by the data messaging system 1 as having a staging area, with the required functionality to allow the use as described below being provided by another component of the data messaging system 1. In an alternative embodiment, specific functionality may be added to, or enabled on, the processing node itself. In other embodiments, the association may be done in other suitable ways. It will be appreciated that the relevance of the association is that a processing node can be identified by the data messaging system 1 as having a staging area associated with it, so that use of the staging area as described later below is possible, however provided.

Next, the data messaging system 1 checks if there are other processing nodes for it to consider (step 205). If so, it repeats the steps of identifying the processing resources required and so on, but for one of the other processing nodes (step 202 and subsequent steps again).

The process is repeated until all processing nodes have been considered. The data messaging system 1 continues to capture statistical data as more messages are processed, and after a sufficient amount of new statistical data has been captured the whole process in repeated using the new statistical data (step 206, and then step 201 and subsequent steps again). In alternative embodiments the process is repeated when a predetermined period of time has passed, is manually triggered, or occurs as part of an established maintenance cycle, for example.

Figure 4B:
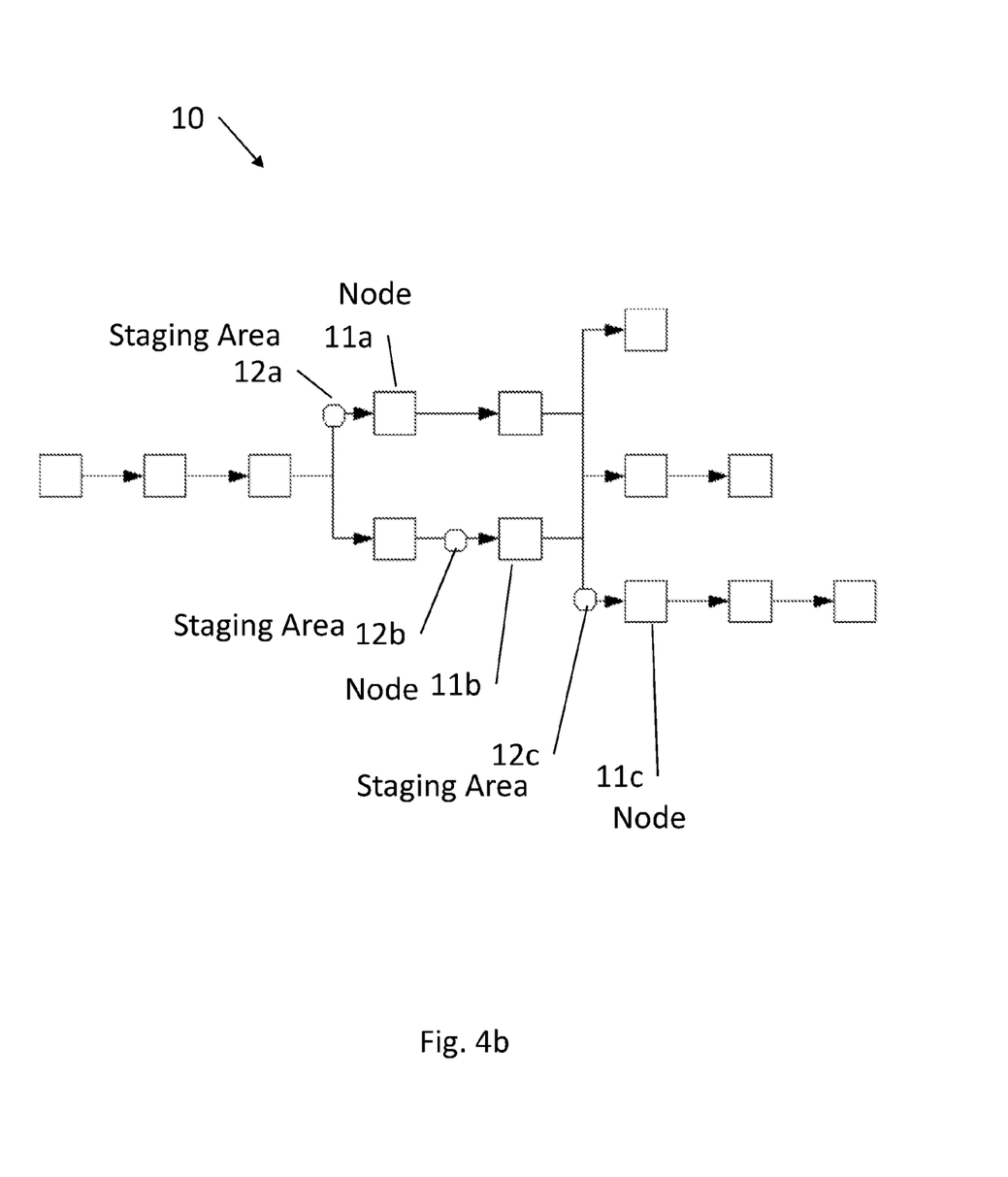

In the present example, after the process has been completed a first time, the processing nodes of the data messaging system 1 are as shown in FIG. 4b. The processing nodes 11a, 11b and 11c have been determined to experience limiting processing resources, for example insufficient CPU availability. As a consequence, the staging areas 12a, 12b and 12c have been associated with the processing nodes.

Figure 2B:
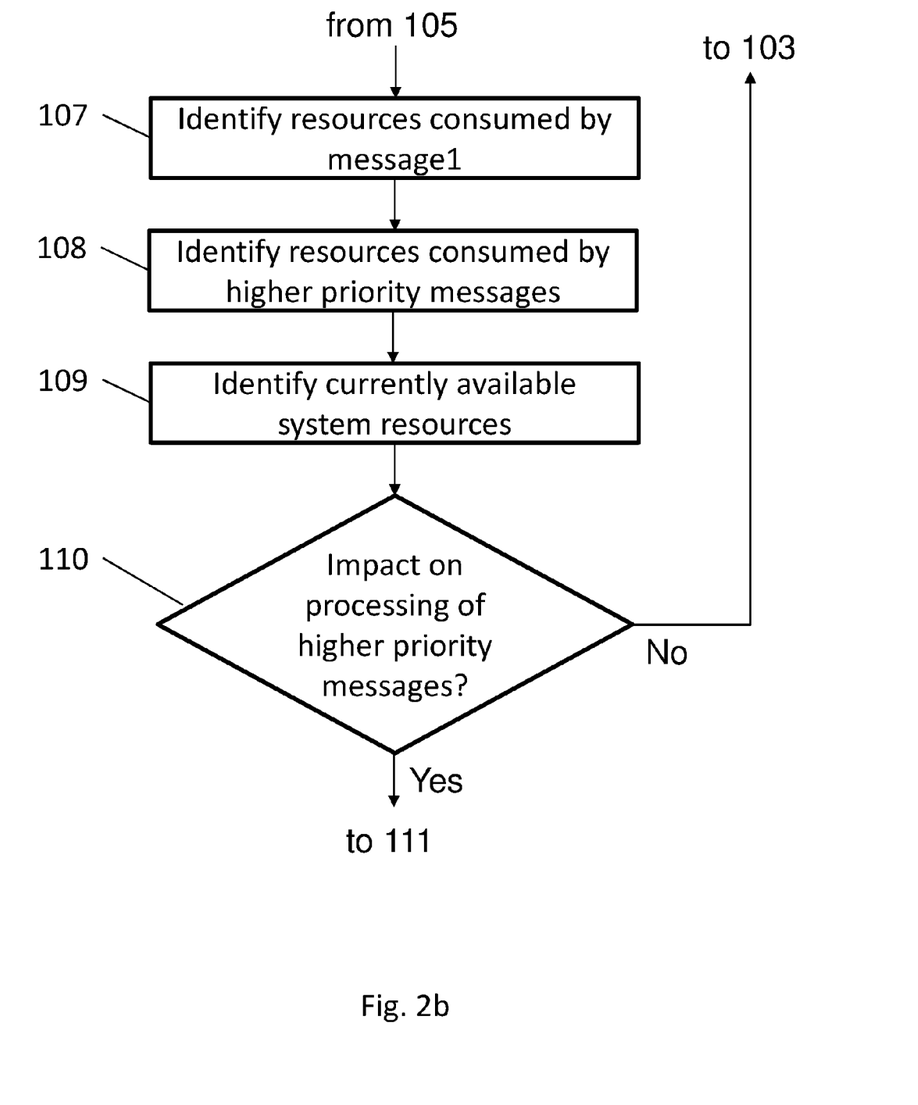
Figure 2C:
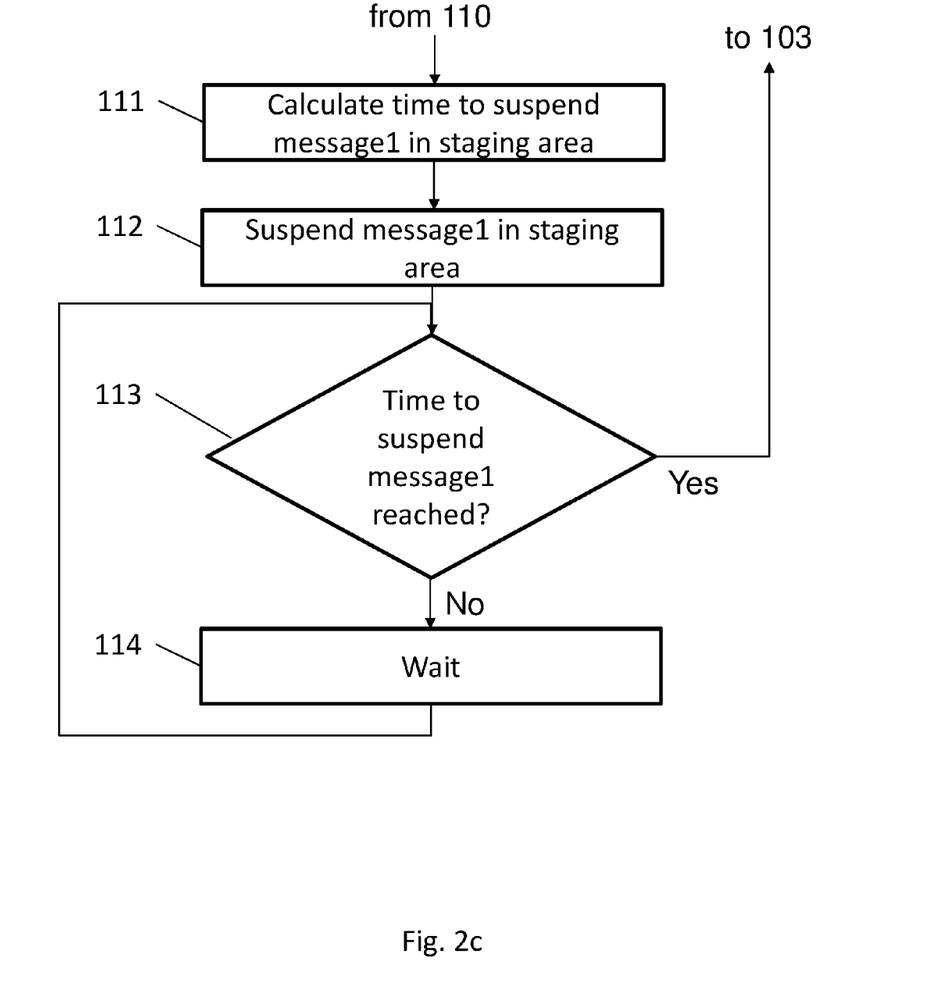

The operation of the data messaging system 1 when processing a message, when the data messaging system 1 includes staging areas, is now described with reference to the flowcharts of FIGS. 2a to 2c, and the chart of FIG. 4b.

As before, the message message1 propagates along successive processing node. However, when message1 if propagated to processing node 11a, the data messaging system 1 identifies that the staging area 12a is associated with the processing node 11a (step 104). (A similar process will occur if message1 takes the other branch, and so is propagated to processing node 11b with staging area 12b.) In some embodiments, the staging area 12a is provided with and makes available data regarding the processing resources that are being heavily utilised ahead.

The data messaging system 1 then determines whether there are any higher priority messages in the data messaging system 1 that require processing (step 105). It does this by checking the global store 3, in which the priority levels of all messages in the data messaging system 1 are stored. In other embodiments, alternative methods are used to determine if there are any higher priority messages, for example the other messages in the data messaging system 1 are directly interrogated. If there are no higher priority messages, message1 is processed by the processing node 11*a* in the usual way, and then propagated to the next processing node (step 103 again).

If, on the other hand, higher priority messages exist, the data messaging system 1 uses the resource models described above to determine the processing resources message1 will require (step 107). The data messaging system 1 then uses the resource models described to determine the processing resources the higher priority messages will require (step 108). The data messaging system 1 then determines the processing resources available to the processing node (step 109). In embodiments in which the staging area 12*a* is provided with data regarding the processing resources that are being heavily utilised ahead, the processing resources available can be determined from this data. The processing resources may include the number of threads available to process different messages.

The data messaging system 1 then uses the determined information to determine if the processing of any of the higher priority messages will be impacted by the processing of the message message1 (step 110), i.e. if message1 will use processing resources that are required by any of the higher priority messages if they are to be optimally processed (e.g. processed as quickly as possible). If the processing of none of the higher priority messages will be impacted, message1 is processed by the processing node 11*a* in the usual way, and then propagated to the next processing node (step 103 again).

It will be appreciated that in alternative embodiments, the determination that the processing of a higher priority message will be impacted could be done in various more or less optimal ways. For example, only the processing resources required by message1 and the available resources could be considered, with it being assumed that a higher priority message will require at least a certain level of resources. Alternatively, only the processing resources required by the higher priority message and the available resources could be considered, with it being assumed that message1 will require at least a certain level of resources. Alternatively again, only the processing resources required by message1 and the processing resources required by the higher priority message could be considered, with it being assumed that there will always be only at most a certain level if available resources.

If, on the other hand, the processing of one or more of the higher priority messages will be impacted, the time message1 should be kept in the staging area is determined (step 111). This will be, for example, the time all the impacted higher priority message will take to be processed. Alternatively, the time may be the time the first higher priority message will take to be processed, for example.

The message message1 is then suspended in the staging area 12*a* (step 112). There are various different ways message1 could be suspended, in alternative embodiments or as alternatives in the same the same embodiment. The thread in which message1 is being processed could be placed into a temporary sleep mode, for example to reduce contention on CPU resources when higher priority messages are being processed in other threads. Alternatively, the thread could switch out its current state to enable the thread itself to be used to process the higher priority message, for example where these is only a single thread available. Once completed, the thread state could be switched back in to allow the processing of message1 to be completed. Alternatively again, if again not enough threads are available the current thread could be suspended and a secondary temporary thread created in which the higher priority message is processed. The temporary thread could then be destroyed when complete, and processing of the thread containing message1 resumed, so ensuring that there are not too many threads were actively processing at any particular point in time.

In an alternative embodiment, the data messaging system is configured to trigger an event when a message is placed on an inbound queue, the event updating a separate part of the global store 3 which stores details of messages waiting to be processed. This part of the global store 3 can then be queried as part of the check whether the processing of any higher priority messages will be impacted (step 110), and if it is determined that not enough threads will be available it can be managed as described above.

The message message1 remains suspended in the staging area 12*a* until the determined time has passed (steps 113 and 114). Once the determined time has passed, message1 is processed by the processing node 11*a* in the usual way, and then propagated to the next processing node (step 103 again).

In alternative embodiments, and for example if the time determined for message1 to be suspended in the staging area is only the time the first higher priority message to be processed will take to be processed, rather than being immediately processed by the processing node 11*a* after the determined time has passed, the step of determining if there are any higher priority messages to be processed is repeated (step 105) and subsequent steps. This allows message1 to be suspended to allow further higher priority messages to be processed, even if those higher priority messages were not present in the data messaging system 1 when message1 was initially propagated to processing node 11*a*.

To ensure that message1 is not suspended for an excessive amount of time (or forever), the data messaging system 1 may impose a limit on the number of times message1 can be suspended in the staging area, or may always propagate it to the next processing node after it has been suspended (which is equivalent to having a limit of one time). Alternatively and/or additionally, the data messaging system 1 can check any Service Level Agreement (SLA) policies attached to the message flow and time-out settings, and use these when determining whether to suspend a message in the staging area, and how long for.

Once message1 has been released from the staging area 12*a* and processed by processing node 11*a*, it is propagated to the next node (step 103 again). It will then continue to propagate along successive processing nodes in the usual way until it passes to the external computing device 8, with the process of checking for higher priority messages occurring if (and only if) it is propagated to processing node 11*c* with staging area 12*c*.

In this way, more control over message processing is provided, enabling higher priority messages to be processed more rapidly, but while not affecting the processing of lower priority messages when there are no higher priority messages that require processing.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of processing messages in a data messaging system comprising a plurality of processing nodes, wherein each message processed by the data messaging system has associated with it a priority level, comprising:

constructing, by a processor of a data messaging system comprising a plurality of processing nodes, a resource model for each processing node of the plurality of processing nodes, the constructing comprising:

monitoring, by the processor, the plurality of processing nodes;

capturing statistical data, by the processor, from each of the plurality of processing nodes about the processing of messages processed by each of the plurality of processing nodes of the data messaging system; and building the resource model, by the processor, for each of the plurality of processing nodes based on the captured statistical data such the data messaging system is configured to determine what resources will be used by each of plurality of processing nodes when processing subsequent messages;

based on the constructed resource models, identifying, by the processor, a processing node in the plurality of processing nodes that will experience limiting processing resources during operation of the data messaging system and then associating, by the processor, a staging area with the identified processing node;

after associating the staging area with the identified processing node, receiving, by the processor, a first message for processing at a processing node of the plurality of processing nodes;

determining that the processing node has an associated message staging area;

determining, by the processor, that a second message received by the data messaging system has a higher priority value than the first message;

after determining that the second message received by the data messaging system has a higher priority value than the first message:

determining, by the processor, based on the constructed resource model of the processing node, an amount of at least one processing resource required by the first message;

determining, by the processor, based on the constructed resource model of the processing node, an amount of the at least one processing resource required by the second message;

determining, by the processor, the amount of the at least one processing resource available to the processing node; and delaying processing of the first message by the processing node based only on a determination, using the determined amounts, that processing of the first message by the processing node would delay the processing of the second message.

2. A computer-implemented method as claimed in claim 1, further comprising the step of saving the priority values of messages received by the data messaging system in a global store.

3. A computer-implemented method as claimed in claim 1, wherein the processing delay is caused by CPU availability, memory availability, disk I/O queues, or processing thread availability.

4. A computer-implemented method as claimed in claim 1, wherein the processing of the first message is delayed only if it has been previously delayed less than a predetermined number of times.

5. A computer-implemented method as claimed in claim 1, wherein the processing of the first message is delayed by temporarily suspending the processing thread in which the first message is being processed.

6. A data messaging system for processing messages comprising a processor communicatively coupled to a memory, a plurality of processing nodes, wherein each message processed by the data messaging system has associated with it a priority level, wherein the data messaging system is configured to:

construct a resource model for each processing node of the plurality of processing nodes by at least:

monitoring the plurality of processing nodes;

capturing statistical data, by the processor, from each of the plurality of processing nodes about the processing of messages processed by each of the plurality of processing nodes of the data messaging system; and building the resource model, by the processor, for each of the plurality of processing nodes based on the captured statistical data such the data messaging system is configured to determine what resources will be used by each of plurality of processing nodes when processing subsequent messages;

based on the constructed resource models, identify a processing node in the plurality of processing nodes that will experience limiting processing resources during operation of the data messaging system, and then associate a staging area with the identified processing node in the data messaging system after associating the staging area with the identified processing node, receive a first message for processing at a processing node of the plurality of processing nodes;

determine that the processing node has an associated message staging area;

determine that a second message received by the data messaging system has a higher priority value than the first message;

after determining that the second message received by the data messaging system has a higher priority value than the first message:

determine, based on the constructed resource model of the processing node, an amount of at least one processing resource required by the first message;

determine, based on the constructed resource model of the processing node, an amount of the at least one processing resource required by the second message;

determine the amount of the at least one processing resource available to the processing node; and delay processing of the first message by the processing node based only on a determination, using the determined amounts, that the processing of the first message by the processing node would delay the processing of the second message.

7. A data messaging system as claimed in claim 6, further comprising a global store, and further arranged to save the priority values of messages received by the data messaging system in the global store.

8. A data messaging system as claimed in claim 6, wherein the processing delay is caused by CPU availability, memory availability, disk I/O queues, or processing thread availability.

9. A data messaging system as claimed in claim 6, wherein the processing of the first message is delayed only if it has been previously delayed less than a predetermined number of times.

10. A data messaging system as claimed in claim 6, arranged to delay the processing of the first message by temporarily suspending the processing thread in which the first message is being processed.

11. A computer program product for processing messages in a data messaging system comprising a plurality of processing nodes, wherein each message processed by the data messaging system has associated with it a priority level, the computer program product comprising a non-transitory computer-readable storage medium having computer-readable program code embodied therewith, the computer-readable program code configured to perform a method comprising:
  constructing, by a processor of a data messaging system comprising a plurality of processing nodes, a resource model for each processing node of the plurality of processing nodes, the constructing comprising:
    monitoring, by the processor, the plurality of processing nodes;
    capturing statistical data, by the processor, from each of the plurality of processing nodes about the processing of messages processed by each of the plurality of processing nodes of the data messaging system; and
    building the resource model, by the processor, for each of the plurality of processing nodes based on the captured statistical data such the data messaging system is configured to determine what resources will be used by each of plurality of processing nodes when processing subsequent messages;
  based on the constructed resource models, identifying, by the processor, a processing node in the plurality of processing nodes that will experience limiting processing resources during operation of the data messaging system and then associating, by the processor, a staging area with the identified processing node;
  after associating the staging area with the identified processing node, receiving, by the processor, a first message for processing at a processing node of the plurality of processing nodes;
  determining that the processing node has an associated message staging area;
  determining, by the processor, that a second message received by the data messaging system has a higher priority value than the first message;
  after determining that the second message received by the data messaging system has a higher priority value than the first message:
    determining, by the processor, based on the constructed resource model of the processing node, an amount of at least one processing resource required by the first message;
    determining, by the processor, based on the constructed resource model of the processing node, an amount of the at least one processing resource required by the second message;
    determining, by the processor, the amount of the at least one processing resource available to the processing node; and
    delaying processing of the first message by the processing node based only on a determination, using the determined amounts, that the processing of the first message by the processing mode would delay the processing of the second message.

* * * * *